(12) United States Patent
Deal

(10) Patent No.: US 7,582,982 B1
(45) Date of Patent: Sep. 1, 2009

(54) OMNI DIRECTIONAL WIND GENERATOR

(76) Inventor: Clarence D. Deal, 14000 N. Choctaw Rd., Jones, OK (US) 73049

( * ) Notice: Subject to any disclaimer, the term of this patent is extended or adjusted under 35 U.S.C. 154(b) by 0 days.

(21) Appl. No.: 12/199,015

(22) Filed: Aug. 27, 2008

(51) Int. Cl.
*F03D 5/04* (2006.01)
(52) U.S. Cl. .......................................... 290/55; 290/44
(58) Field of Classification Search .................. 290/43, 290/44, 54, 55; 416/147
See application file for complete search history.

(56) References Cited

U.S. PATENT DOCUMENTS

| | | |
|---|---|---|
| 0,204,481 A | 6/1878 | Cleveland |
| 0,581,311 A | 4/1897 | Scovel et al. |
| 0,695,524 A | 3/1902 | Woodell |
| 0,757,800 A | 4/1904 | Williams |
| 1,002,833 A | 9/1911 | Giddings |
| 1,112,203 A | 9/1914 | Fandrey |
| 1,345,022 A | 6/1920 | Oliver |
| 1,361,696 A | 12/1920 | Domenico |
| 1,599,944 A | 9/1926 | Baumgart |
| 1,600,105 A | 9/1926 | Fonkiewicz |
| 1,783,669 A | 12/1930 | Oliver |
| 3,750,001 A | 7/1973 | McCloskey |
| 3,883,750 A | 5/1975 | Uzzell, Jr. |
| 4,019,828 A | 4/1977 | Bunzer |
| 4,039,848 A * | 8/1977 | Winderl ..................... 290/55 |
| 4,070,131 A | 1/1978 | Yen |
| 4,207,741 A | 6/1980 | Rainey |
| 4,289,970 A * | 9/1981 | Deibert ..................... 290/44 |
| 4,318,019 A * | 3/1982 | Teasley et al. ......... 310/156.35 |
| 4,379,972 A | 4/1983 | Sosa et al. |
| 4,421,452 A | 12/1983 | Rougemont |
| 4,452,562 A | 6/1984 | Hsu |
| 4,545,729 A | 10/1985 | Storm |
| 4,706,593 A | 11/1987 | Vail, Jr. |
| 4,779,006 A | 10/1988 | Wortham |
| 4,816,697 A | 3/1989 | Nalbandyan et al. |
| 4,978,071 A | 12/1990 | MacLean et al. |
| 5,009,569 A | 4/1991 | Hector, Sr. et al. |
| 5,395,598 A | 3/1995 | Prueitt |
| 5,483,798 A | 1/1996 | Prueitt |
| 5,525,037 A | 6/1996 | Cummings |
| 5,588,386 A | 12/1996 | Schilt |
| 5,823,749 A | 10/1998 | Green |

(Continued)

FOREIGN PATENT DOCUMENTS

| CA | 2306491 A1 | 10/2001 |
|---|---|---|

*Primary Examiner*—Nicholas Ponomarenko
(74) *Attorney, Agent, or Firm*—Mary M. Lee

(57) ABSTRACT

A wind generator comprising omni directional wind vanes as the source of mechanical energy. The generator comprises an inner and outer rotor, each rotor supporting a plurality of radially extending vanes. The vanes are configured to have a front side that captures wind and a back side that deflects wind. All the vanes on the inner rotor are oriented with their front sides facing in the same direction, and all the vanes on the outer rotor or oppositely oriented. In this way, the inner and outer rotors spin in opposite directions in response to a wind from any direction. Permanent magnets are mounted on the inner shaft to rotate with the inner rotor, and corresponding oppositely-oriented permanent magnets are supported on the outer shafts. Coils, connectable to a load, are mounted between the oppositely orbiting magnets. As the inner and outer rotors spin, the magnets intermittently energize the coils.

17 Claims, 6 Drawing Sheets

U.S. PATENT DOCUMENTS

| | | | |
|---|---|---|---|
| 6,011,334 | A | 1/2000 | Roland |
| 6,064,123 | A * | 5/2000 | Gislason .................... 290/55 |
| 6,239,507 | B1 | 5/2001 | Douthit |
| 6,249,059 | B1 | 6/2001 | Hosoda |
| 6,278,197 | B1 * | 8/2001 | Appa .................... 290/55 |
| 6,289,834 | B1 | 9/2001 | Phillips |
| 6,409,467 | B1 | 6/2002 | Gutterman |
| 6,492,743 | B1 * | 12/2002 | Appa .................... 290/55 |
| 6,537,025 | B2 | 3/2003 | Hopkins et al. |
| 6,891,294 | B1 | 5/2005 | Deal |
| 6,952,058 | B2 * | 10/2005 | McCoin .................... 290/44 |
| 7,026,723 | B2 | 4/2006 | Moreno |
| 7,135,786 | B1 | 11/2006 | Deets |
| 7,183,664 | B2 | 2/2007 | McClintic |
| 7,417,334 | B2 * | 8/2008 | Uchiyama .................... 290/55 |
| 2003/0035725 | A1 | 2/2003 | Sosonkina |
| 2003/0178855 | A1 | 9/2003 | Li |
| 2004/0113431 | A1 | 6/2004 | Huang |

* cited by examiner

US 7,582,982 B1

OMNI DIRECTIONAL WIND GENERATOR

FIELD OF THE INVENTION

The present invention relates to wind generators.

BACKGROUND OF THE INVENTION

As the cost of fossil fuels rises, so does the need to develop alternative energy sources. One unlimited source of energy is wind, and many types of wind turbines have been developed to serve in a variety of applications. The present invention relates to a wind generator that is omni directional.

DETAILED DESCRIPTION OF THE PREFERRED EMBODIMENT(S)

Figure 1:
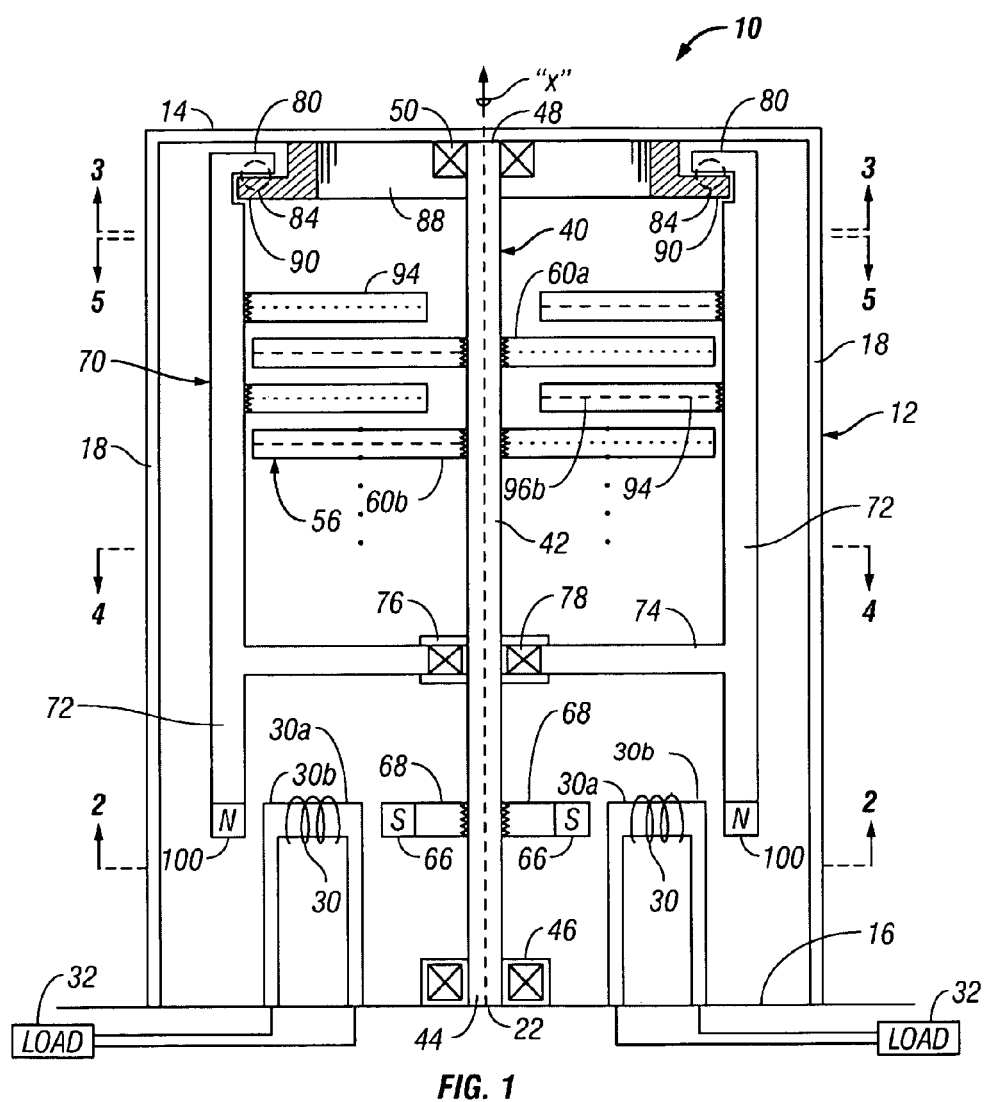
FIG. 1 is a vertical sectional, partly schematic view of a wind generator comprising an omni directional wind turbine constructed in accordance with the present invention.
Figure 2:
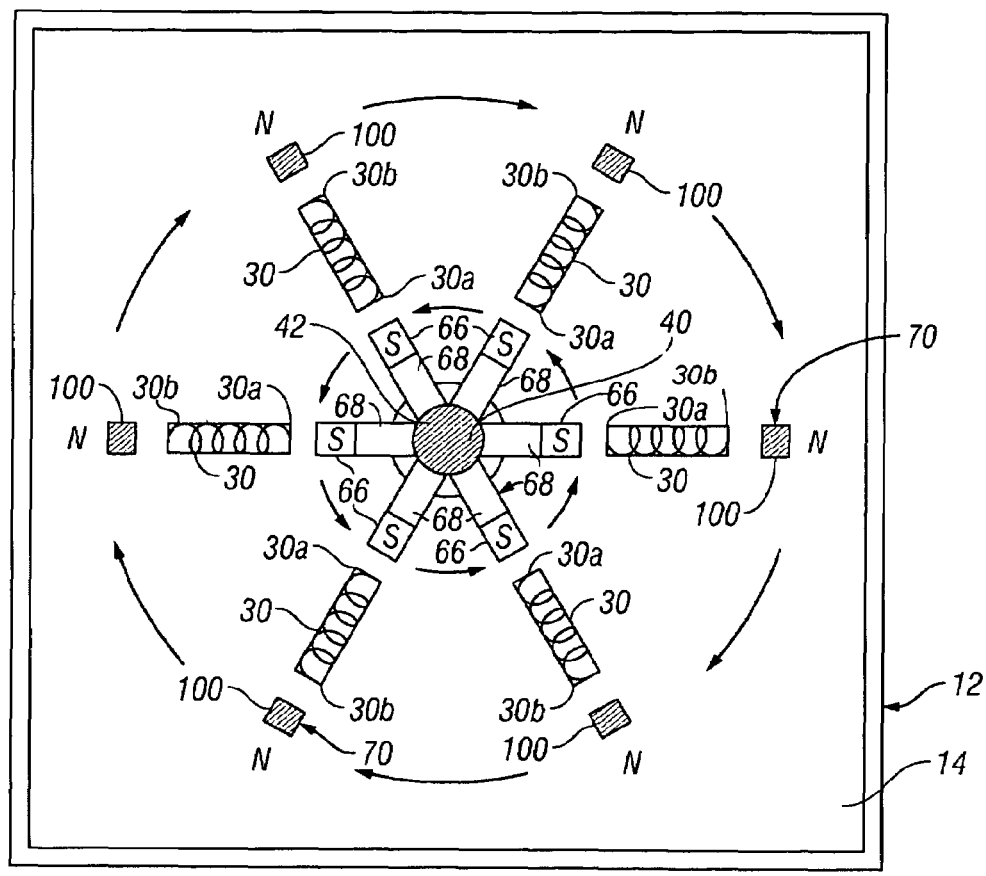
FIG. 2 is cross sectional view through the wind generator of FIG. 1 taken along line 2-2.

Turning now to the drawings in general and to FIG. 1 in particular, there is shown therein a wind generator constructed in accordance with the present invention and designated generally by the reference numeral 10. The generator 10 comprises a frame 12, which may take various forms. In the embodiment shown herein, the frame 12 comprises a roof 14 and a floor 16 with corner posts 18 therebetween. With reference now also to FIGS. 2-5, supported at the center 22 of the frame 12 is at least one and preferably a plurality of coils, designated collectively at 30. The coils 30 may vary in number, usually in the range of 2-8, the preferred embodiment illustrated with 6 coils (FIG. 2). The coils 30 are arranged radially around the center 22 of the frame 22. Each of the coils has a proximal end "30a" and a distal end "30b." Preferably, the coils are double wound, but this is not essential.

Each coil 30 is electrically connectable to a load 32. As shown in FIG. 1, each load is connectable to a separate load 32. However, it will be appreciated that the coils 30 may be used to power a single load or multiple loads, as may be desired. As used herein, "load" is used broadly to denote any device capable of using or storing electrical energy and specifically includes batteries, fuel cells, and other energy storage devices.

With continuing reference to FIGS. 1-5, the generator 10 includes an inner rotor 40. The inner rotor 40 comprises a vertical inner shaft 42 having a length extending from the floor 16 to the roof 14. The inner shaft 42 is mounted at the center 22 of the frame 12 for rotation about its longitudinal axis "x." To that end, as seen in FIG. 1, the bottom 44 of the shaft 42 may be supported in a bearing assembly, such as the thrust bearing assembly 46. Likewise the top 48 of the inner shaft 42 may be supported in a bearing assembly 50.

Figure 5:
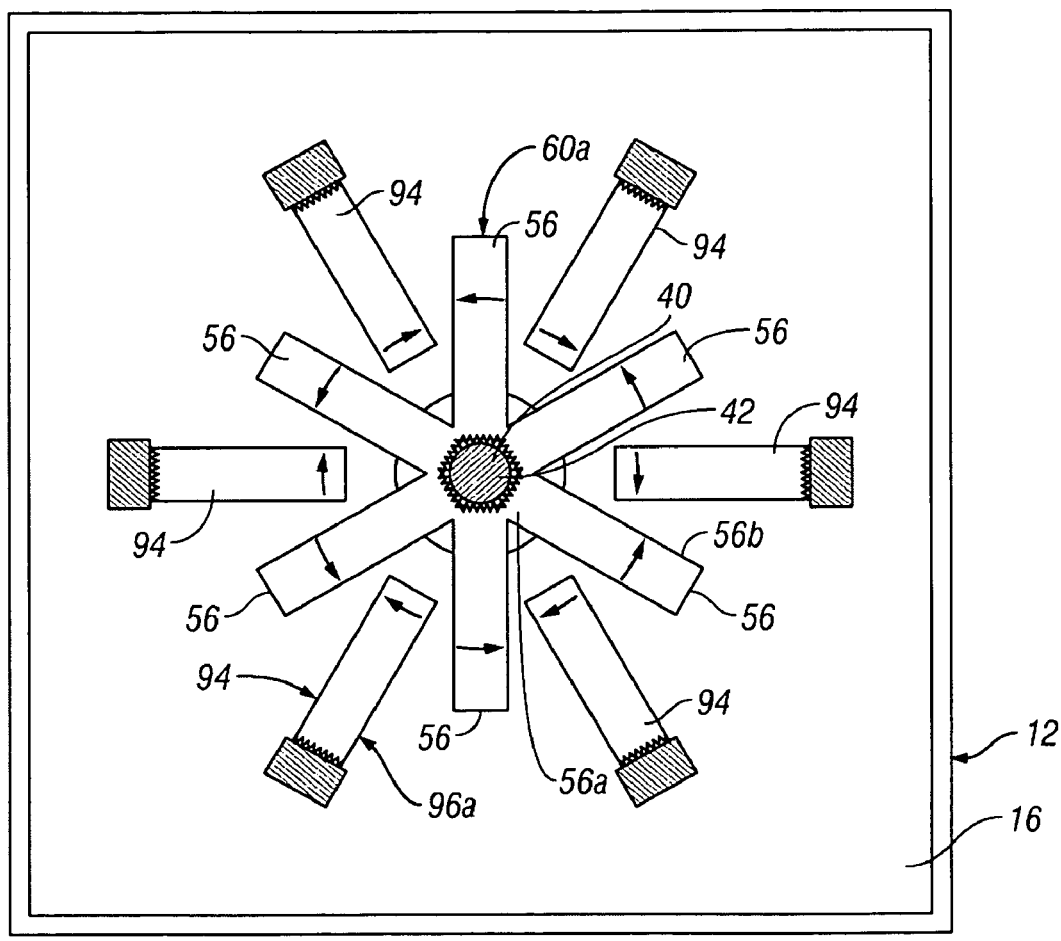
FIG. 5 is cross sectional view through the wind generator of FIG. 1 taken along line 5-5.
Figure 6:
FIG. 6 is a perspective view of one of the vanes of the wind generator shown in FIG. 1.

As best seen in FIG. 5, the inner rotor 40 further comprises a plurality of inner vanes all designated as 56, each having proximal ends 56a and distal ends 56b. The proximal ends 56a of the inner vanes 56 are fixed to the inner shaft 42 for rotation therewith. Preferably, the plurality of inner vanes 56 comprises a plurality of tiers 60a and 60b (FIG. 1), each tier comprising a plurality of inner vanes all at the same level, extending radially from the shaft 42 like the spokes of a wheel. The number of inner vanes 56 on each tier 60 may vary. Six vanes 56 are shown in each tier 60 in the illustrated embodiment, but this is only exemplary. Additionally, although in the preferred embodiment, each tier 60 has the same number of vanes 56, the number of vanes on tier may differ from the number of vanes on the other tiers. In most instances, the vanes 56 will be positioned equa-distant around the shaft 42, as this will promote good balance.

As shown best in FIGS. 1 and 2, the inner rotor 40 includes at least one and preferably a plurality of inner magnets 66. There is an inner magnet 66 for each of the coils 30. Each of the inner magnets 66 is supported on the inner shaft 42 for rotation therewith. This may be accomplished by fixing the magnets 66 at the end of radially projecting spokes 68 fixed to the inner shaft 42 level with the coils 30. Now it will be understood that the inner magnets 66 are positioned on the inner shaft 42 so that as the inner rotor 40 rotates, the inner magnets orbit inside the circle formed by the proximal ends 30a of the coils 30, each magnet passing close enough to the ends 30a to induce a current in the coils.

As seen in FIG. 2, in the preferred embodiment, all the inner magnets 66 are oriented so that their South poles are exposed to the proximal ends 30a of the coils. However, this orientation could be reversed. Still further, the orientation of the inner magnets 66 could alternate. While permanent magnets 66 are shown and described herein, electromagnets could be substituted.

In addition to the inner rotor 40, the generator 10 comprises an outer rotor 70. The outer rotor 70 comprises at least one and preferably a plurality of vertical shafts 72. Although the number of shafts 72 in the outer rotor 70 may vary, it is preferred that the number of shafts 72 equals the number of coils 30, and thus the outer 70 here is shown with 6 shafts 72. Each shaft 72 is supported within the frame 12 a fixed and equal distance apart from each other and from the inner shaft 42 of the inner rotor 40. As shown in FIGS. 1 and 2, this may be achieved by providing a rotating frame, such as the spider 74 to which each of the shafts 72 is fixed. The hub 76 of the spider 74 is rotatably supported on the inner shaft 42 by a lower bearing assembly 78.

Figure 3:
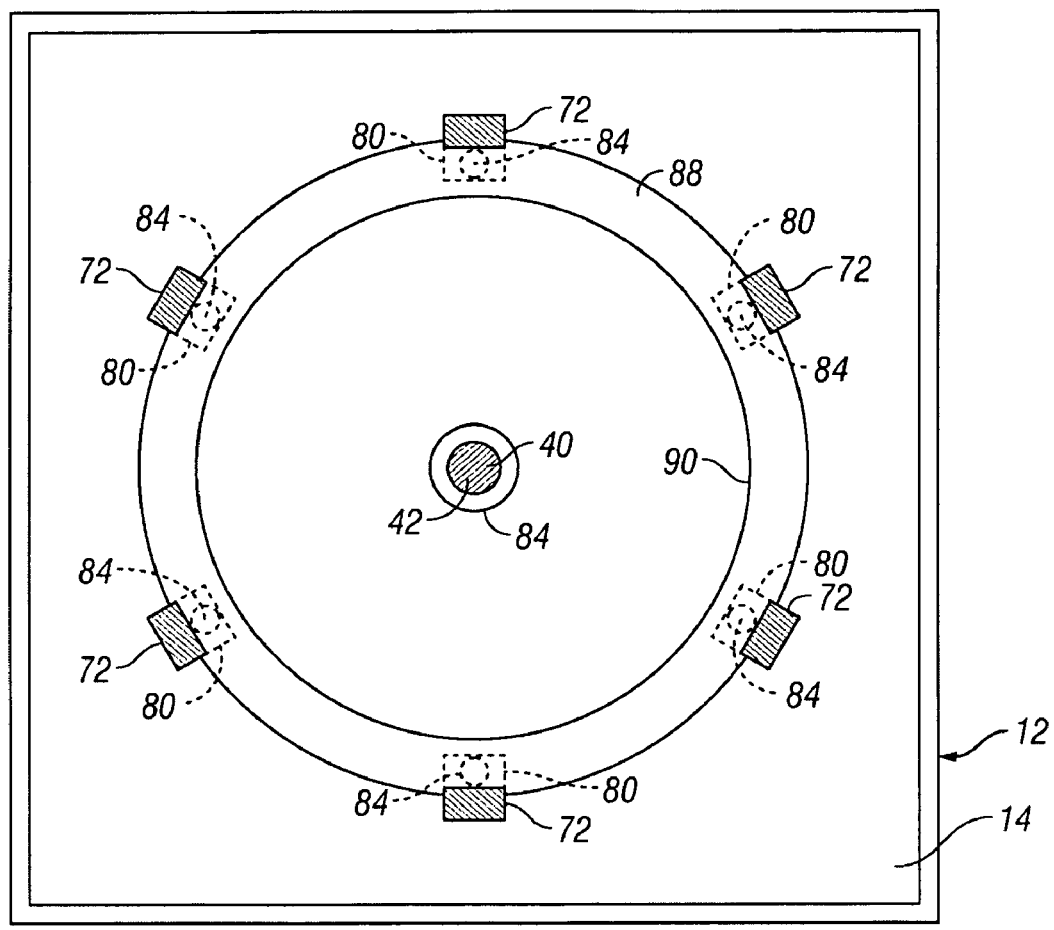
FIG. 3 is cross sectional view through the wind generator of FIG. 1 taken along line 3-3.
Figure 4:
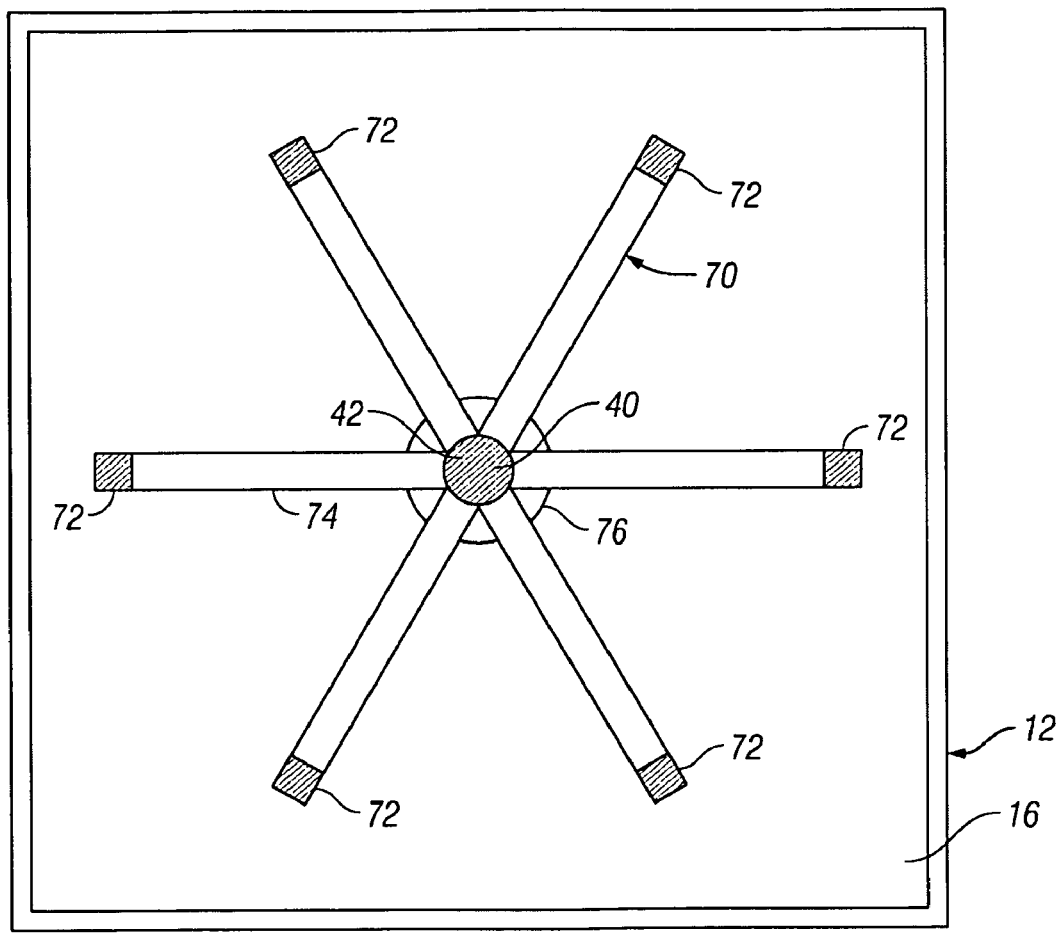
FIG. 4 is cross sectional view through the wind generator of FIG. 1 taken along line 4-4.

As seen in FIGS. 1 and 3, the top of each shaft 72 may include a flange 80, which forms the upper race of an upper bearing assembly 84. The upper bearing assembly 84 also includes a collar 88 that is fixed to the roof 14 of the frame 12. The peripheral edge 90 of the collar 88 forms the lower race. In this way, the outer shafts 72 ride on the edge 90 of the collar 88. The upper and lower bearing assemblies 78 and 84 also serve to keep the shafts 72 vertically aligned as they orbit the inner shaft 42. The outer rotor 70 includes a plurality of vanes 94. Preferably, the vanes 94 include at least one and more preferably multiple vanes on each shaft 72, forming multiple tiers 96a and 96b of vanes. All the vanes 94 extend radially from the shafts 72, and the shafts are oriented so that the vanes 94 all are aligned radially relative to the inner shaft 42. The tiers 96 are spaced apart vertically along the length of the shafts 72 so that the vanes 94 pass between the vanes 56 of the inner rotor 40. Although the generator 10 shown in the drawings has only 2 tiers of vanes 56 on the inner rotor 40 and two tiers 96 of vanes 94 on the outer rotor 70, it will be appreciated that number could be increased significantly.

Most preferably, the vanes 94 are sized and the shafts 72 are positioned so that the ends of the vanes 94 extend almost to the inner shaft 42 and the ends of the vanes 56 of the inner rotor 40 extend almost to the outer shafts 72. This makes most efficient use of the space occupied by the generator 10.

Referring still to FIGS. 1 and 2, the outer rotor 70 also includes at least one and preferably a plurality of magnets 100, including at least one magnet for each of the shafts 72. The magnets 100 conveniently may be fixed to the bottom of each of the outer shafts 72. By properly selecting the length of the shafts 72, this will position the magnets 100 at the same level as the coils 30, as seen in FIG. 1. Thus, the magnets 100 extend from the outer shafts so that each outer magnet passes the distal end 30b of each coil 30 as the outer shafts 72 orbit the inner shaft 42.

As seen in FIG. 2, in the preferred embodiment, all the outer magnets 100 are oriented so that their North poles "N" are exposed to the distal ends 30b of the coils. Of course, the magnets 100 are positioned so that as they move past the coils 30 a current is generated. That is, the orientation of the outer magnets 100 is opposite to that of the inner magnets 66, all of which are South "S". However, this orientation could be reversed. Still further, the orientation of the inner magnets 100 could alternate. While permanent magnets 100 are shown and described herein, electromagnets could be substituted.

Turning now to FIGS. 6-9, the preferred structure for the vanes 56 and 94 will be described. As the vanes preferably all are similarly formed, only one of the inner vanes 56 will be described. Although the structure may vary, a simple V-shape is ideal. Alternately, an arced, cupped, or semi-circular configuration may be employed.

Figure 7:
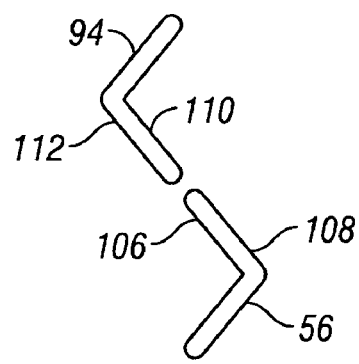
FIG. 7 is a cross-sectional view through two of the vanes, one an inner vane on the inner rotor and one an outer vane on the outer rotor, illustrating how the back side of one deflects air towards the front side of the other.
Figure 8:
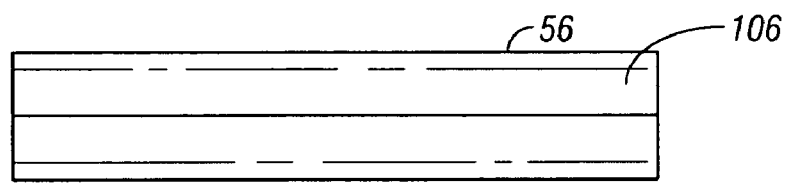
FIG. 8 is a front view of the vane shown in FIG. 6.
Figure 9:
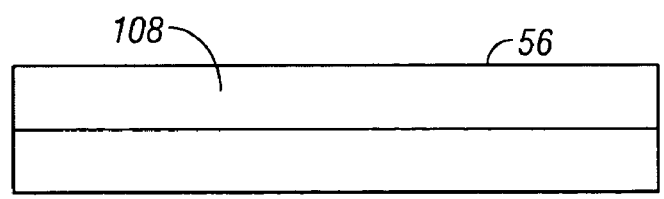
FIG. 9 is a back view of the vane shown in FIG. 6.

FIG. 7 shows on outer vane positioned immediately above an inner vane, both being shown in cross-section. The inner vane 56 has a front side 106 that is concave forming a recess that tends to collect wind. The back side 108 of the vane 56 is oppositely configured, that is, it is convex or tapered in a manner that tends to deflect wind above and below the vane. The outer vane 94 is oppositely oriented, having a front side 110 and back side 112.

As shown in FIG. 7, the back side 112 of the outer vane 94 defects air upwardly and downwardly, towards the inner vanes immediately above and below it, such as the vane 56. More specifically, the lower half of the back side 112 deflects air into the recessed front side 106 of the vane 56. Conversely, when wind is blowing in the opposite direction, the back side 108 of the inner vane 56 defects air upwardly and downwardly, towards the outer vanes immediately above and below it. More specifically, the upper half of the back side 108 deflects air into the recessed front side 110 of the outer vane 94.

As shown in FIG. 1, recessed or front sides 106 of the inner vanes 56 are indicated by dashed lines, while the back sides 108 of the outer vanes 94 are indicated by dotted lines. Now it will be apparent that all the inner vanes 56 are oriented with the front sides 106 facing in the same direction, and all the outer vanes 94 are oppositely oriented. Thus, as seen in FIG. 2, as the inner rotor 40 rotates in a first direction, such as counter-clockwise, the outer vanes 94 will rotate in a second and opposite direction, that is, clockwise.

Now it will be understood that a current will be induced in the coils 30 every time an inner magnet 66 or an outer magnet 100 passes by its proximal end 30a or its distal end 30b, respectively. It will be understood further that, if movement of the rotors 40 and 70 is synchronized so that an inner magnet 66 is adjacent the proximal end 30a at the same moment an outer magnet 100 is adjacent the distal end 30b of the same coil 30, the induced current will have twice the amplitude. A track bearing, idler gear or other suitable device (not shown) could be employed to synchronize the rotors.

As shown herein, all the inner magnets 66 are arranged with the same pole, South, exposed to the coil, and all the outer magnets 100 are arranged with the opposite pole, North, exposed. This produces a pulsating direct current. Alternately, the polarity of both the inner and outer magnets 66 and 100 could be alternated, which would produce an alternating current.

Now it will be appreciated that the wind generator of the present invention provides a current in response to wind from any direction as because of the configuration of the rotor in combination with a support frame that is open to the wind from all directions. Additionally, because of the versatility of the design, the type and amplitude of the current generator can be modified to suit any particular situation.

The content of U.S. Pat. No. 6,891,294, entitled "Electric Motor Vehicle Comprising Same," [sic] issued May 10, 2005, is incorporated herein by reference.

The embodiments shown and described above are exemplary. Many details are often found in the art and, therefore, many such details are neither shown nor described herein. It is not claimed that all of the details, parts, elements, or steps described and shown were invented herein. Even though numerous characteristics and advantages of the present invention have been described in the drawings and accompanying text, the description is illustrative only. Changes may be made in the details, especially in matters of shape, size, and arrangement of the parts within the principles of the inventions to the full extent indicated by the broad meaning of the-terms of the following claims. The description and drawings of the specific embodiments herein do not point out what an infringement of this patent would be, but rather provide an example of how to use and make the inventions.

What is claimed is:

1. A wind generator for supplying electricity to a load, the generator comprising:

a frame having a center;

at least one coil, each of the at least one coil being aligned radially relative to the center of the frame and having a proximal end and a distal end and being electrically connectable to the load; and an inner rotor comprising:

a vertical inner shaft having a length and being mounted in the center of the frame for rotation about its longitudinal axis;

a plurality of vanes each extending radially from the inner shaft; and at least one inner magnet, including an inner magnet for each of the at least one coil, each of the inner magnets extending radially from the inner shaft and fixed thereto for rotation therewith and positioned so that as the inner rotor rotates the inner magnet passes the proximal end of the coil; and an outer rotor comprising:

a vertical outer shaft for each of the at least one coil, each supported a distance from the inner shaft of the inner rotor and each being mounted for orbital movement around the inner shaft;

a plurality of outer vanes fixed to and extending radially from each of the least one outer shaft so that each outer vane is radially aligned relative to the inner shaft; and at least one outer magnets including an outer magnet for each of the at least one outer shafts in the outer rotor, each outer magnet extending from one of the outer shafts so that each outer magnet passes the distal end of each the at least one coil as the outer shafts orbits the inner shaft;

wherein the at least one inner magnet and the at least one outer magnet are positioned relative to the at least one coil so that as either an inner or outer magnet passes a coil a current is generated;

wherein all the inner and outer vanes have a front side and a back side, the front sides configured to collect wind and the back sides configured to deflect wind, and wherein all the vanes on the inner shaft are oriented with the front sides facing the same direction and all the vanes on the outer shafts are oppositely oriented, so that the inner rotor rotates in a first direction and the outer rotor rotates in a second and opposite direction.

2. The wind generator of claim 1 wherein each of the inner and outer vanes is V-shaped in cross-section.

3. The wind generator of claim 1 wherein the plurality of inner vanes comprises a plurality of tiers, each tier comprising a plurality of inner vanes.

4. The wind generator of claim 3 wherein the plurality of outer vanes comprises a plurality of tiers, each tier comprising a plurality of inner vanes.

5. The wind generator of claim 4 wherein the lengths of the inner and outer vanes are selected to cause the inner and outer vanes to overlap each other and wherein the tiers of inner vanes are offset from the tiers of outer vanes so that all the tiers move freely relative to all the other tiers.

6. The wind generator of claim 5 wherein each of the inner and outer vanes is V-shaped in cross-section.

7. The wind generator of claim 1 wherein the at least one coil is double wound.

8. The wind generator of claim 7 wherein the rotation of the inner shaft and the orbital movement of the at least one outer shaft are synchronized so that the at least one inner magnet moves past the proximal end of the at least one coil simultaneously with movement of the least one outer magnet past the distal end of the coil.

9. The wind generator of claim 8 wherein the at least one coil comprises a plurality of coils.

10. The wind generator of claim 9 wherein the plurality of coils comprises 2 to 8 coils.

11. The wind generator of claim 9 wherein the plurality of coil equals 6 coils.

12. The wind generator of claim 9 wherein the at least one inner magnet is oriented with the same pole exposed to the proximal ends of the coils.

13. The wind generator of claim 12 wherein all the outer magnets are oriented with the same pole exposed to the distal ends of the coils, the exposed poles of the inner magnets being opposite to the exposed poles of the outer magnets.

14. The wind generator of claim 1 wherein the at least one inner magnet and the at least one outer magnet are permanent magnets.

15. The wind generator of claim 1 wherein the at least one coil comprises a plurality of coils.

16. The wind generator of claim 15 wherein the plurality of coils comprises 2 to 8 coils.

17. The wind generator of claim 15 wherein the plurality of coil equals 6 coils.

* * * * *